(12) United States Patent
Matsushita et al.

(10) Patent No.: US 7,336,456 B2
(45) Date of Patent: Feb. 26, 2008

(54) CONTROL-MOTOR SYSTEM

(75) Inventors: Masaki Matsushita, Tokyo (JP); Takayuki Kifuku, Tokyo (JP); Hideki Doi, Tokyo (JP); Katsuhiko Ohmae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 125 days.

(21) Appl. No.: 11/177,331

(22) Filed: Jul. 11, 2005

(65) Prior Publication Data
US 2006/0055243 A1  Mar. 16, 2006

(30) Foreign Application Priority Data
Sep. 10, 2004  (JP) ............... 2004-264572

(51) Int. Cl.
H02H 7/08  (2006.01)
(52) U.S. Cl. ........................ 361/31; 318/563
(58) Field of Classification Search ................. 361/31, 361/33; 318/661, 563
See application file for complete search history.

(56) References Cited

U.S. PATENT DOCUMENTS

| | | | |
|---|---|---|---|
| 3,483,457 A * | 12/1969 | Edwards, Jr. et al. ....... | 318/138 |
| 5,079,549 A | 1/1992 | Liessner | |
| 5,469,032 A * | 11/1995 | Otake ......................... | 318/439 |
| 6,205,009 B1 | 3/2001 | Clark et al. | |
| 6,389,373 B1 * | 5/2002 | Ohya .......................... | 702/189 |
| 6,868,933 B2 * | 3/2005 | Kameya ..................... | 180/404 |
| 2005/0135035 A1 * | 6/2005 | Tsutsui ....................... | 361/93.1 |

FOREIGN PATENT DOCUMENTS

| | | |
|---|---|---|
| EP | 0472246 A2 | 2/1992 |
| EP | 0 978 947 A2 | 2/2000 |
| EP | 1302753 A1 | 4/2003 |
| JP | 61-62390 A | 3/1986 |

(Continued)

OTHER PUBLICATIONS

French search report dated Sep. 28, 2006.

(Continued)

Primary Examiner—Michael Sherry
Assistant Examiner—Nicholas Ieva
(74) Attorney, Agent, or Firm—Sughrue Mion, PLLC

(57) ABSTRACT

An objective is to detect a resolver malfunction without fail, using a low-cost resolver having the small number of the poles, and a control-motor system having advantage in small sizing and high-power outputting. In the control-motor system, the system for driving a 2m-pole motor based on a rotor rotation angle θ detected by a 2n-pole resolver, where m and n being counting numbers, is characterized in that: the sum of the square of a signal modulated by sin θ and the square of a signal modulated by cos θ in the resolver in which an excitation signal generated in said system is modulated by sin θ and cos θ in response to the rotor rotation angle θ of the resolver is compared to a predetermined malfunction threshold value, so that malfunction determination related to the resolver is performed, and also, given that the sum is $a^2$ when the resolver is recognized to be in normal operation, the malfunction determination threshold value is made to be not smaller than $\{a \times \cos((\pi/2)/(m/n))\}^2$.

15 Claims, 7 Drawing Sheets

FOREIGN PATENT DOCUMENTS

| | | |
|---|---|---|
| JP | 62-99815 U | 6/1987 |
| JP | 01 195322 A | 8/1989 |
| JP | 08 210874 A | 8/1996 |
| JP | 08-289521 A | 11/1996 |
| JP | 09-072758 * | 3/1997 |
| JP | 3136937 B2 | 12/2000 |
| JP | 2003-26020 A | 1/2003 |

OTHER PUBLICATIONS

Office Action from German Patent Trademark received on Dec. 5, 2006.

* cited by examiner

Malfunction-determination region

US 7,336,456 B2

CONTROL-MOTOR SYSTEM

BACKGROUND

1. Field of the Invention

The present invention relates to resolver-malfunction-detection methods that are most suitable for electromotive power steering systems for vehicles, etc., and to systems for controlling motors using the methods.

2. Description of the Related Art

FIG. 7 is a view illustrating a conventional resolver-signal-detection system (refer to Japanese Laid-Open Utility Model Publication 99,815/1987).

In FIG. 7, numerals 51a and 51b denote square circuits, numerals 52a and 52b denote rectifier circuits, numeral 53 denotes an adder circuit, numeral 54 denotes a voltage regulator circuit, and numeral 55 denotes a comparator circuit.

A method is disclosed, in which, by comparing the sum of the square of a sine signal and the square of a cosine signal with a predetermined voltage, so that an abnormality is determined.

SUMMARY OF THE INVENTION

In the conventional resolver-signal-detection system, the publication has not disclosed regarding threshold voltages of the malfunction determination.

Depending on the combination of the number of poles of the resolver and the number of poles of the motor, an actual electrical angle of the motor and an electrical angle detected by the resolver may differ by not smaller than 90 degrees when a malfunction such as wire breakage of the resolver occurs. If the detected value of the motor-electrical-angle shifts not smaller than 90 degrees, an outputted torque indicates in the direction opposite to the pointed one. In a case in which such a control-motor system is applied to, for example, an electromotive power steering system, because the motor generates steering assist power in the direction opposite to steering power by a driver when a malfunction has occurred, anti-steering power generates approximately in proportion to the steering power; in the worst case, the steering becomes a locked state. Depending on a set value of the threshold voltage for determining the malfunction, it has been a problem that the malfunction determination in a steering-locked state may become remarkably difficult.

An objective of the present invention, which has been made to solve the foregoing problems, is to detect a resolver malfunction without fail using a system, for controlling a motor, in which a low-cost resolver having the small number of the poles and a multi-pole motor having advantage in small sizing and high-power outputting are combined.

In a control-motor system according to the present invention, the system for driving a 2m-pole motor based on a rotor rotation angle $\theta$ having detected by a 2n-pole resolver, where m and n being counting numbers, is characterized in that: the sum of the square of a signal amplitude-modulated by $\sin \theta$ and the square of a signal amplitude-modulated by $\cos \theta$ in the resolver in which an excitation signal generated in the system is modulated by $\sin \theta$ and $\cos \theta$ in response to the resolver rotation angle $\theta$ of the motor is compared to a predetermined malfunction threshold value, so that malfunction determination related to the resolver is performed, and also, given that the sum is $a^2$ when the resolver is recognized to be in normal operation, the malfunction determination threshold value is made to be not smaller than $\{a \times \cos((\pi/2)/(m/n))\}^2$.

In a control-motor system according to the present invention, given that an amplitude of the excitation signal is b, and a transforming rate of the resolver is k, a value, $a^2$, when the resolver is recognized to be in normal operation is given by $(k \times b)^2$.

In a control-motor system according to the present invention, driving the motor is stopped in response to determination in that a malfunction has occurred in the resolver, when the value of the sum continuously stays at not greater than the determination threshold value for a first predetermined time, meanwhile, driving the motor is started in response to determination in that the resolver is in normal operation, when the value of the sum continuously stays at not smaller than the determination threshold value for a second predetermined time.

In a control-motor system according to the present invention, the motor-driving is held in a stop, when the value of the sum continuously stays at not greater than the determination threshold value for a third predetermined time, until the motor is restored, and the first predetermined time is set shorter than the third predetermined time.

In a control-motor system according to the present invention, values recognized to be the amplitudes of signals modulated by the $\sin \theta$ and the $\cos \theta$ are sampled, so that malfunction-determination processing of the resolver is performed by discrete-system processing.

In a control-motor system according to the present invention, a value recognized to be the amplitude of the excitation signal is sampled, so that malfunction-determination processing of the resolver is performed by discrete-system processing.

Moreover, in a control-motor system according to the present invention, the excitation signal is stopped when it is determined that a malfunction has occurred in the resolver.

Furthermore, in a control-motor system according to the present invention, an output torque of the motor is made to be transmitted into a steering system of a vehicle.

A resolver-malfunction can be detected without fail, because in a control-motor system according to the present invention, the system for driving a 2m-pole motor based on a rotor rotation angle $\theta$ having detected by a 2n-pole resolver, where m and n being counting numbers, is characterized in that: the sum of the square of a signal amplitude-modulated by $\sin \theta$ and the square of a signal amplitude-modulated by $\cos \theta$ in the resolver in which an excitation signal generated in the system is modulated by $\sin \theta$ and $\cos \theta$ in response to the resolver rotation angle $\theta$ of the motor is compared to a predetermined malfunction threshold value, so that malfunction determination related to the resolver is performed, and also, given that the sum is $a^2$ when the resolver is recognized to be in normal operation, the malfunction determination threshold value is made to be not smaller than $\{a \times \cos((\pi/2)/(m/n))\}^2$.

A resolver-malfunction can be detected without fail, regardless of excitation-amplitude variation, because in a control-motor system according to the present invention, given that an amplitude of the excitation signal is b, and a transforming rate of the resolver is k, a value, $a^2$, when the resolver is recognized to be in normal operation is given by $(k \times b)^2$.

A period in which an output-torque direction of a motor is made to be reversed against a pointed one can be made the shortest, and wrong determination due to noises, etc. can be also prevented, so that a resolver-malfunction can be detected without fail, because in a control-motor system according to the present invention, driving the motor is stopped in response to determination in that a malfunction has occurred in the resolver, when the value of the sum continuously stays at not greater than the determination threshold value for a first predetermined time, meanwhile, driving the motor is started in response to determination in that the resolver is in normal operation, when the value of the sum continuously stays at not smaller than the determination threshold value for a second predetermined time.

A period in which an output-torque direction of a motor is made to be reversed against a pointed one can be made the shortest, and wrong determination due to noises, etc. can be also prevented, so that a resolver-malfunction can be detected without fail, because in a control-motor system according to the present invention, the motor-driving is held in a stop, when the value of the sum continuously stays at not greater than the determination threshold value for a third predetermined time, until the motor is restored, and the first predetermined time is set shorter than the third predetermined time.

A resolver-malfunction can be determined using a microcomputer, because in a control-motor system according to the present invention, values recognized to be the amplitudes of signals modulated by the sin θ and the cos θ are sampled, so that malfunction-determination processing of the resolver is performed by discrete-system processing.

A resolver-malfunction can be determined using a microcomputer, because in a control-motor system according to the present invention, a value recognized to be the amplitude of the excitation signal is sampled, so that malfunction-determination processing of the resolver is performed by discrete-system processing.

Moreover, excitation-circuit burning when a malfunction has occurred can prevented, because in a control-motor system according to the present invention, the excitation signal is stopped when it is determined that the malfunction has occurred in the resolver.

Furthermore, a more secure steering control system can be created, because in a control-motor system according to the present invention, an output torque of the motor is made to be transmitted into a steering system of a vehicle.

DETAILED DESCRIPTION OF THE PREFFERED EMBODIMENTS

Embodiment 1

A first embodiment according to the present invention is explained with reference to drawings.

Figure 1:
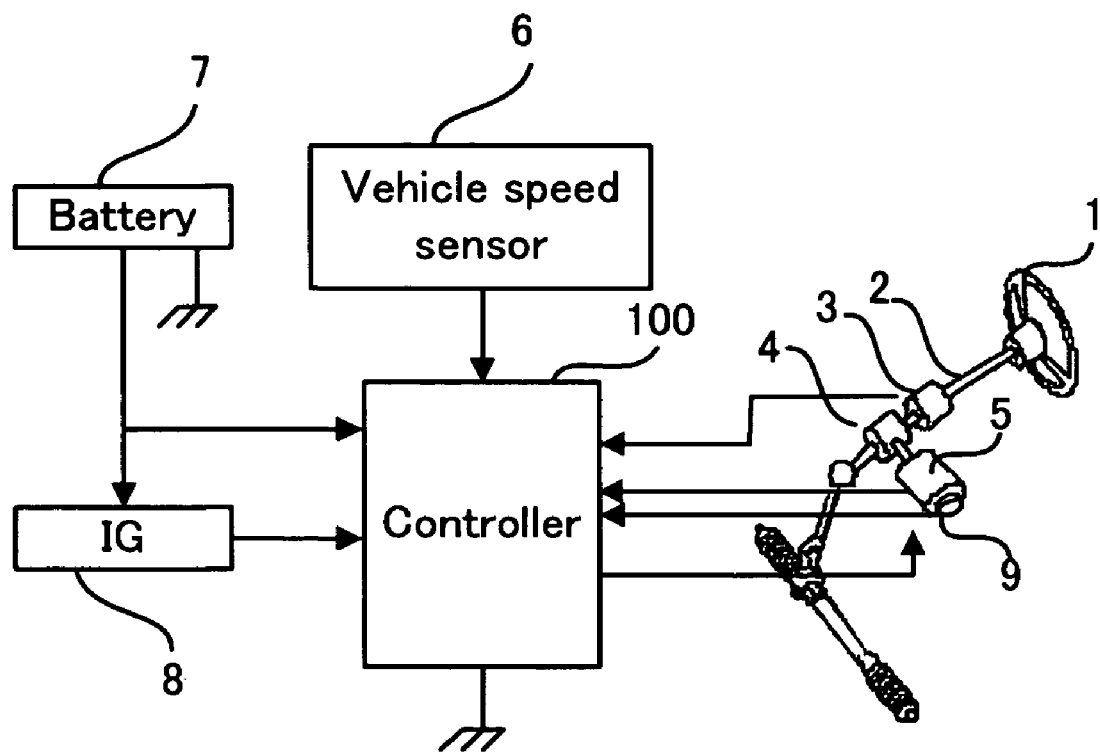
FIG. 1 is a block diagram illustrating an embodiment of the present invention.

FIG. 1 is a block diagram illustrating an electromotive-power-steering control system according to the embodiment of the present invention.

A permanent magnet synchronous motor (hereinafter referred to as a PM motor) 5 that generates a steering assist torque is connected to an end of a steering shaft 2 through a speed reduction gear 4, and a steering wheel 1 is connected to the other end of the steering shaft 2. Moreover, a torque sensor 3 that detects a steering torque of the steering wheel 1 is connected to the steering shaft 2.

A controller 100 determines the steering assist torque based on a detected torque value by the torque sensor 3 and a detected vehicle speed value by a vehicle speed sensor 6, and assists the steering operation of the steering wheel 1 by driving the PM motor in response to a rotor position detected by a resolver 9. The controller 100 is also connected to the battery 7 and to an ignition (IG) 8, which is also connected to the battery 7.

Figure 2:
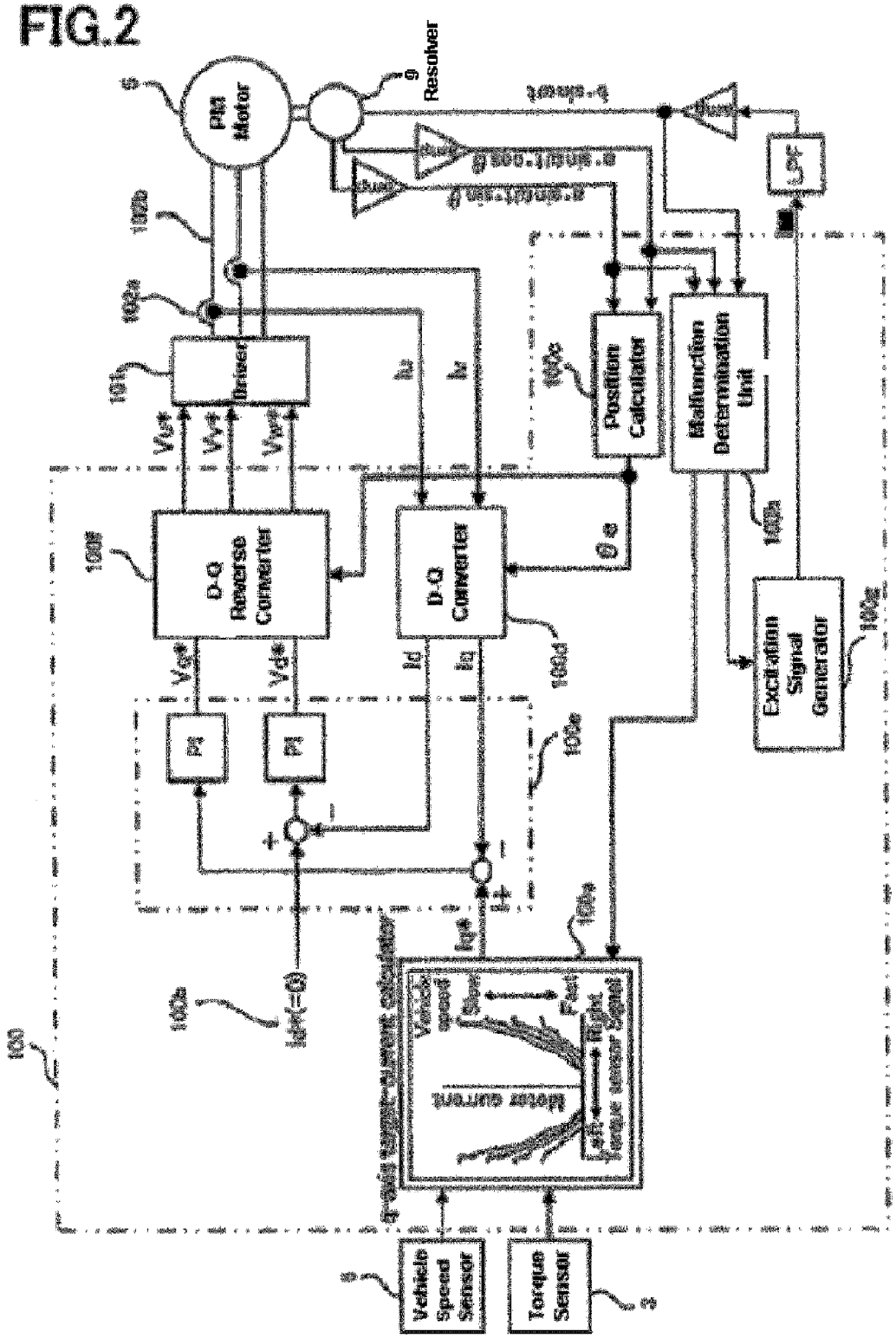
FIG. 2 is a diagram illustrating a control block of a control-motor system used in an electromotive power steering system according to Embodiment 1 of the present invention.

FIG. 2 is a view functionally illustrating the electromotive-power-steering control system according to Embodiment 1.

In this embodiment, an example is explained in which an eight-pole motor (m=4) and a four-pole resolver (n=2) are combined.

The controller 100 in this figure is a microcomputer for controlling the steering assist, and its software configuration is represented by function blocks inside the representation of the microcomputer 100. In FIG. 2, the microcomputer 100 includes a q-axis target-current calculator 100a, a d-axis target-current setting unit 100b, a position calculator 100c, a d-q converter 100d, a current controller 100e, a d-q reverse converter 100f, an excitation signal generator 100g, and a malfunction-determination unit 100h.

The q-axis target-current calculator 100a performs predetermined calculation based on a detected torque signal by the torque sensor 3 that detects the steering torque and a detected vehicle speed signal by the vehicle speed sensor 6 that detects vehicle speed, so as to determine the q-axis target-current value (Iq*) for driving the PM motor 5, and then inputs into the current controller 100e the determined q-axis target-current value.

However, in a case in which a motor-drive-stop signal is inputted from the malfunction-determination unit 100h, a q-axis target-current of nil is inputted into the current controller 100e.

The d-axis target-current setting unit 100b inputs into the current controller 100e a d-axis target-current of nil.

Figure 3A:
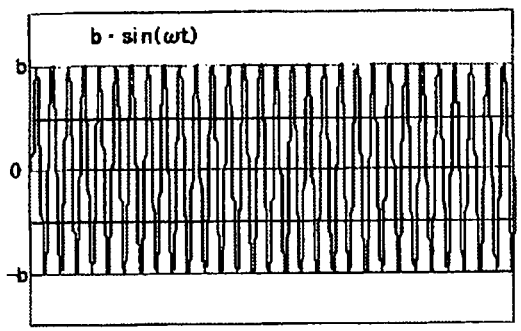
FIGS. 3A, 3B, 3C, 3D and 3E are views representing wave-form examples of resolver signals according to the embodiment of the present invention.
Figure 3B:
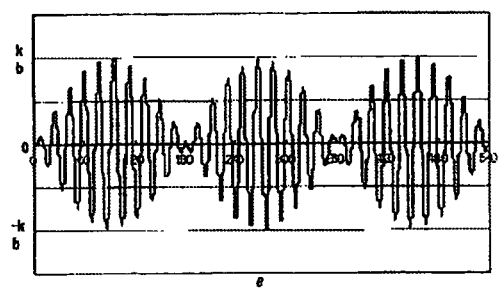
Figure 3C:
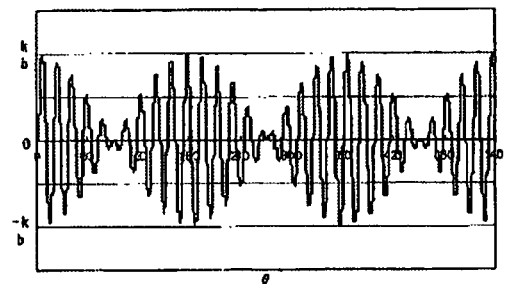

The excitation signal generator 100g generates a pulse signal at a frequency of 10 kHz for generating an excitation signal in the resolver 9. The pulse signal is inputted into the resolver 9 as an excitation signal b·sin ωt (FIG. 3A), after its waveform has been shaped. Given that the transforming rate of the resolver is k, amplitude-modulated excitation signals, in response to the rotor angle θ, are outputted from the resolver 9, which are a signal k·b·sin θ·sin ωt (FIG. 3B) in which the amplitude is modulated by sin θ, and a signal k·b·cos θ·sin ωt (FIG. 3C) in which the amplitude is modulated by cos θ.

Figure 3D:
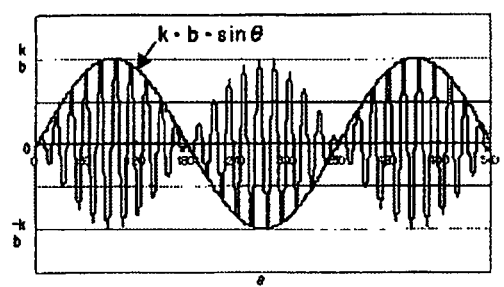
Figure 3E:
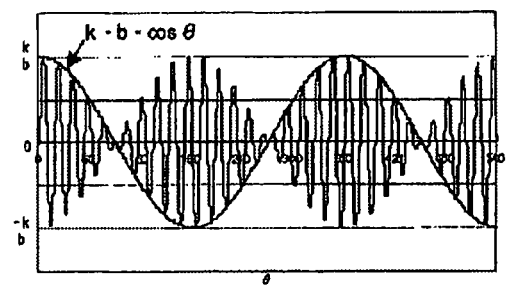

The position calculator 100c calculates a resolver position θ using the relationship of θ=arc tan(sin θ/cos θ), based on information of k·b·sin θ and k·b·cos θ (FIG. 3D, FIG. 3E, respectively) having been obtained by sampling signals that can be recognized to be amplitudes of the signals being amplitude-modulated by the above sin θ, and cos θ, respectively.

Moreover, because the motor has eight poles (m=4) whereas the resolver has four poles (n=2), an electrical angle θe of the motor is obtained by calculation using the relationship of θe=(m/n)×θ=2×θ, and then the value of θe is inputted into the d-q converter 100d and d-q reverse converter 100f.

The d-q converter 100d performs three-phase-to-two-phase conversion (d-q conversion), based on phase-current values (Iu, Iv) (having been) detected by respective current sensors 102a and 102b, and on the electrical angle θe, then inputs into the current controller 100e d- and q-axis current (Id, Iq).

The current controller 100e performs PI (proportional and integral) control, based on the deviation between the d- and q-axis target current (Id*, Iq*) and the detected d- and q-axis current (Id, Iq), then generates d- and q-axis target applying voltages (Vd*, Vq*).

The d-q reverse converter 100f performs two-phase-to-three-phase conversion (d-q reverse conversion), based on the d- and q-axis target applying voltages (Vd*, Vq*) and the electrical angle θe, then inputs into a driver 101 three-phase target applying voltages (Vu*, Vv*, Vw*).

The malfunction-determination unit 100h calculates the sum of the squares of k·b·sin θ and k·b·cos θ obtained by sampling signals that can be recognized to be amplitudes of the signals being amplitude-modulated by the above sin θ, and cos θ, respectively, and also calculates a malfunction-determination threshold value as $\{a·\cos((\pi/2)/(m/n))\}^2$ $(=\{k·b·\cos(45\ \deg)\}^2)$, based on a value of $a^2$ that has been calculated by a relational formula of $a^2=(k·b)^2$, using an excitation-signal amplitude b obtained by sampling a signal that can be recognized to be the amplitude of the resolver-excitation signal, and the resolver transforming rate k that has been memorized in advance.

The malfunction-determination unit 100h determines that a malfunction has occurred when a state in which the sum of the squares is not greater than the malfunction-determination threshold value, continues for a first predetermined time, then outputs into the q-axis target-current calculator 100a a motor-drive-stop signal.

Moreover, the malfunction-determination unit 100h determines that the system is in normal operation when a state in which the sum of the squares is not smaller than the malfunction-determination threshold value, continues for a second predetermined time, then outputs a motor-drive-permission signal into the q-axis target-current calculator 100a.

Furthermore, the malfunction-determination unit 100h determines that a malfunction has occurred when a state in which the sum of the squares is not smaller than the malfunction-determination threshold value, continues for a third predetermined time set longer than the first one, then outputs a motor-drive-stop signal, into the q-axis target-current calculator 100a, until the system is restarted, and also stops the pulse signals outputted from the excitation signal generator 100g.

Next, an example of detecting a malfunction when a wire breakage has occurred in the resolver is explained.

For example, in a case in which breakage of a sin-signal wire of the resolver has occurred, because the sin θ value inputted into the position calculator 100c becomes nil, the detected value of the motor-electrical-angle θe is fixed at zero degrees. Whereby, because the electrical angle of the motor stays at 90 degrees or 270 degrees (=−90 degrees) in response to a torque generating direction, the steering of the electromotive power steering system, in the worst case, goes into a locked state.

Figure 4:
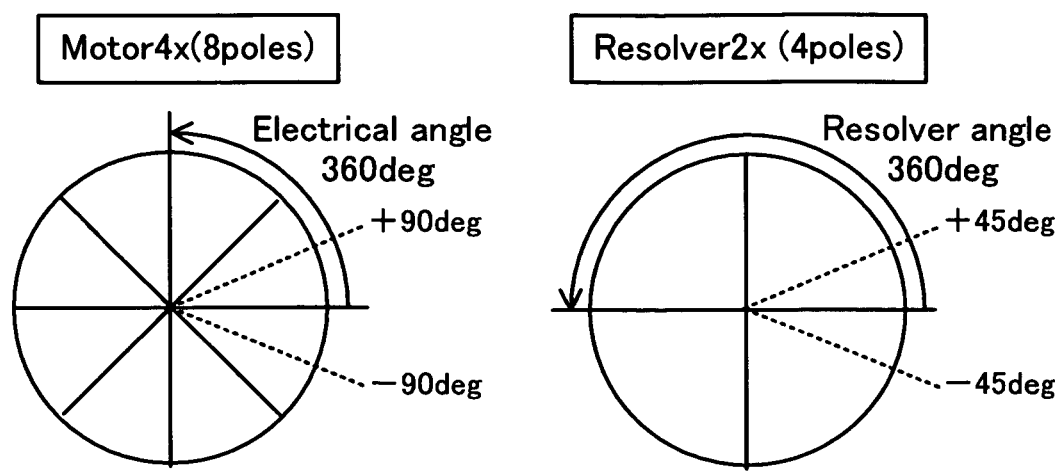
FIG. 4 is views representing relationships between electrical angles and resolver angles according to the embodiment of the present invention.

Here, the resolver angle of the resolver stays at 45 degrees or 315 degrees (=−45 degrees). A relationship between the motor-electrical-angle θe and the resolver angle θ is illustrated in FIG. 4.

Figure 5:
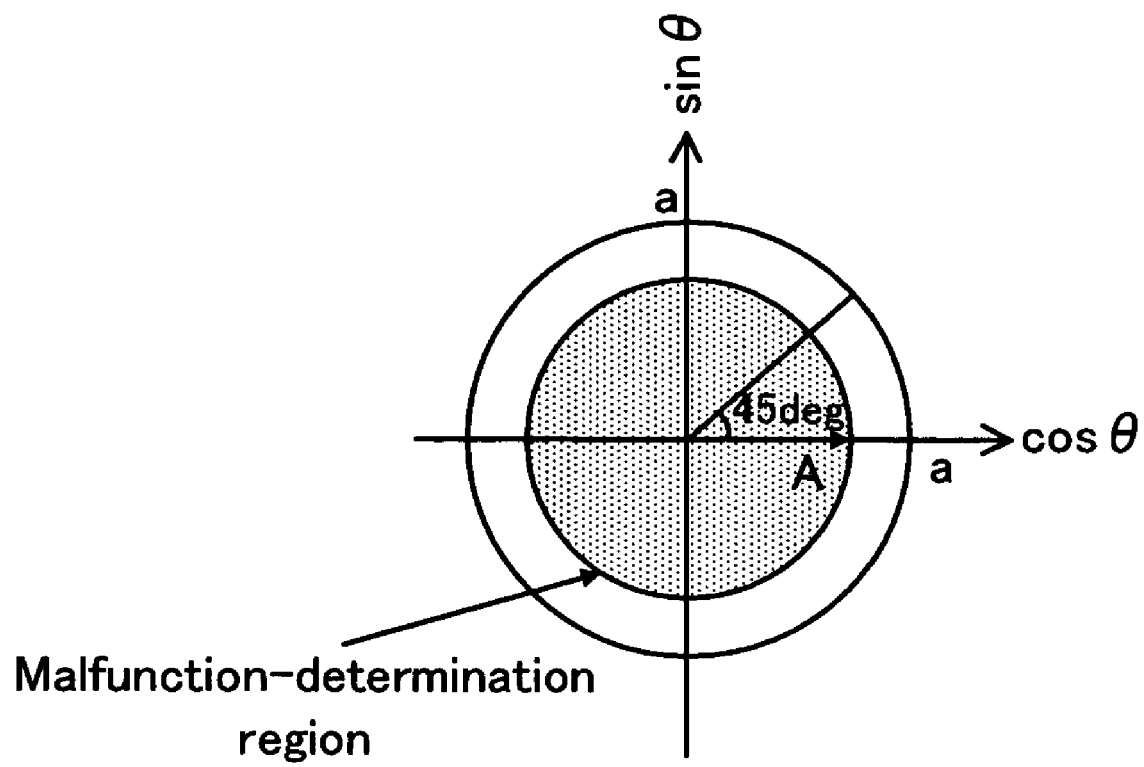
FIG. 5 is a view illustrating a malfunction-determination region according to Embodiment 1 of the present invention.

Here, with reference to the signals inputted into the malfunction-determination unit 100h, the sine signal becomes nil due to the wire breakage, and the cosine signal becomes k·b·cos(45 deg.). These states can be expressed by a vector A in FIG. 5 using vector representation, and a malfunction can be detected when the vector A is in a malfunction-determination region.

That is, when the malfunction-determination threshold value is not smaller than the sum of the squares of the detected sine signal and cosine signal, $0^2+\{k·b·\cos(45\ \deg.)\}^2$, malfunction-detection becomes possible.

In this embodiment in which the eight-pole motor (m=4) and the four-pole resolver (n=2) are combined, because the malfunction-determination threshold value is set equal to or greater than $\{a·\cos((\pi/2)/(m/n))\}^2$, that is, $\{k·b·\cos(45\ \deg)\}^2$, malfunction-detection without fail becomes possible.

As described above, in the electromotive power steering system according to this embodiment, even in a state in which the steering is locked due to the wire breakage in the resolver, a malfunction can be detected without fail.

Moreover, because the excitation-signal amplitude b is detected so that the malfunction-determination threshold value is calculated in response to the detected excitation-amplitude value, the resolver-malfunction can be detected without fail, regardless of excitation-amplitude variation.

Embodiment 2

Figure 6:
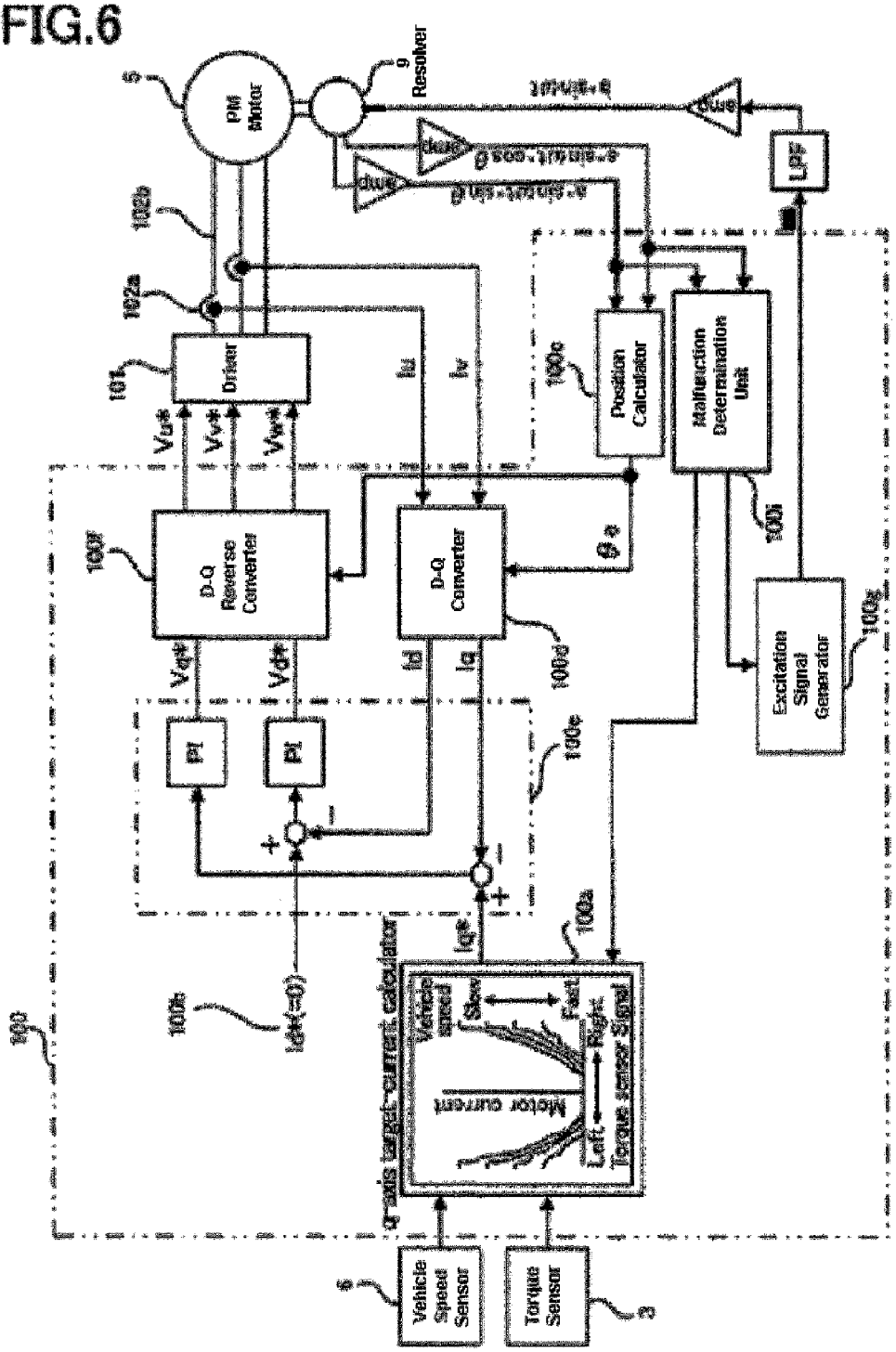
FIG. 6 is a diagram illustrating a control block of a control-motor system used in an electromotive power steering system according to Embodiment 2 of the present invention.
Figure 7:
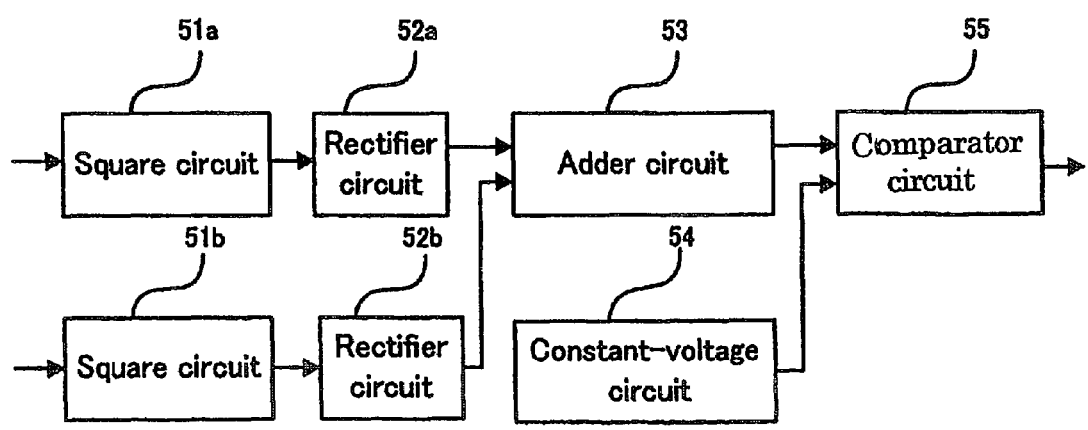
FIG. 7 is a block diagram representing a conventional resolver-malfunction-determination method.

FIG. 6 is a configurational view illustrating an electromotive-power-steering control system according to Embodiment 2 of the present invention. Here, elements having the function similar to that in Embodiment 1 are represented by the same numerals, and the explanation is omitted.

A malfunction-determination unit 100i memorizes a malfunction-determination threshold value calculated in advance based on a resolver-excitation amplitude and transforming rate, thereby it performs malfunction determination based on this memorized malfunction-determination value.

This embodiment, compared to Embodiment 1, has an advantage in that a resolver-excitation-signal monitor circuit need not be provided, and calculation of the malfunction-determination threshold value is not required.

What is claimed is:

1. A control-motor system, the system for driving a 2m-pole motor based on a rotor rotation angle θ detected by a 2n-pole resolver, where m and n being counting numbers, the system comprising:

the sum of the square of a signal modulated by sin θ and the square of a signal modulated by cos θ in the resolver in which an excitation signal generated in said system is modulated by sin θ and cos θ in response to the rotor rotation angle θ of the resolver is compared to a predetermined malfunction threshold value, so that malfunction determination related to the resolver is performed, and also, given that the sum is $a^2$ when the resolver is recognized to be in normal operation, the malfunction determination threshold value is made to be not smaller than $\{a \times \cos((\pi/2)/(m/n))\}^2$.

2. A control-motor system as recited in claim 1, wherein values recognized to be the amplitudes of signals modulated by the sin θ and the cos θ are sampled, so that malfunction-determination processing of the resolver is performed by discrete-system processing.

3. A control-motor system as recited in claim 1, wherein driving the motor is stopped in response to determination in that a malfunction has occurred in the resolver, when the value of the sum continuously stays at not greater than the determination threshold value for a first predetermined time, meanwhile, driving the motor is started in response to determination in that the resolver is in normal operation, when the value of the sum continuously stays at not smaller than the determination threshold value for a second predetermined time.

4. A control-motor system as recited in claim 3, wherein values recognized to be the amplitudes of signals modulated by the sin θ and the cos θ are sampled, so that malfunction-determination processing of the resolver is performed by discrete-system processing.

5. A control-motor system as recited in claim 3, wherein the motor-driving is held at a stop, when the value of the sum continuously stays at not greater than the determination threshold value for a third predetermined time, until the motor is restarted, and the first predetermined time is set shorter than the third predetermined time.

6. A control-motor system as recited in claim 5, wherein values recognized to be the amplitudes of signals modulated by the sin θ and the cos θ are sampled, so that malfunction-determination processing of the resolver is performed by discrete-system processing.

7. A control-motor system as recited in claim 1, wherein, given that an amplitude of the excitation signal is b, and a transforming rate of the resolver is k, a value, $a^2$, when the resolver is recognized to be in normal operation is given by $(k \times b)^2$.

8. A control-motor system as recited in claim 7, wherein values recognized to be the amplitudes of signals modulated by the sin θ and the cos θ are sampled, so that malfunction-determination processing of the resolver is performed by discrete-system processing.

9. A control-motor system as recited in claim 7, wherein driving the motor is stopped in response to determination in that a malfunction has occurred in the resolver, when the value of the sum continuously stays at not greater than the determination threshold value for the first predetermined time, meanwhile, driving the motor is started in response to determination in that the resolver is in normal operation, when the value of the sum continuously stays at not smaller than the determination threshold value for the second predetermined time.

10. A control-motor system as recited in claim 9, wherein values recognized to be the amplitudes of signals modulated by the sin θ and the cos θ are sampled, so that malfunction-determination processing of the resolver is performed by discrete-system processing.

11. A control-motor system as recited in claim 9, wherein the motor-driving is held in a stop, when the value of the sum continuously stays at not greater than the determination threshold value for the third predetermined time, until the motor is restarted, and the first predetermined time is set shorter than the third predetermined time.

12. A control-motor system as recited in claim 11, wherein values recognized to be the amplitudes of signals modulated by the sin θ and the cos θ are sampled, so that malfunction-determination processing of the resolver is performed by discrete-system processing.

13. A control-motor system as recited in claim 7, wherein a value recognized to be the amplitude of the excitation signal is sampled, so that malfunction-determination processing of the resolver is performed by discrete-system processing.

14. A control-motor system as recited in claim 1, wherein the excitation signal is stopped when it is determined that a malfunction has occurred in the resolver.

15. A control-motor system as recited in claim 1, wherein an output torque of the motor is made to be transmitted into a steering system of a vehicle.

* * * * *